United States Patent
Hong et al.

(10) Patent No.: US 6,316,376 B1
(45) Date of Patent: Nov. 13, 2001

(54) DIELECTRIC CERAMIC COMPOSITIONS AND METHOD OF PREPARATION THEREFOR

(76) Inventors: Kug Sun Hong, 11-1502, Sampoong Apt., Seocho 4-dong, Seocho-ku, Seoul 137-074; Jung-Kun Lee, 11-205, Imkwang Apt., Bangbae 3-dong, Seocho-ku, Seoul 137-755; Dong-Wan Kim, 409-76, Shinlimbon-dong, Gwanak-ku, Seoul 151-029; Hyun-Seok Jung, 2-607, Jinheung Apt., Samsung-dong, Kangnam-ku, Seoul 135-090; Hee-Bum Hong, 10-191, Shinlimbon-dong, Gwanak-ku, Seoul 151-029; Jae-Yun Lee, 1560-22, Shinlim 9-dong, Gwanak-ku, Seoul 151-019; Soung-Jun Yoon, 653-4, Simkokbon 1-dong, Sosa-ku, Buchon-city, Kyeonggi-do 422-241, all of (KR)

( * ) Notice: Subject to any disclaimer, the term of this patent is extended or adjusted under 35 U.S.C. 154(b) by 0 days.

(21) Appl. No.: 09/765,575

(22) Filed: Jan. 22, 2001

(30) Foreign Application Priority Data

Nov. 17, 2000 (KR) .................................................. 00-68498

(51) Int. Cl.[7] ....................... C04B 35/499; C04B 35/468; C04B 35/465; C04B 35/47

(52) U.S. Cl. ............................ 501/138; 501/136; 501/137
(58) Field of Search ...................................... 501/136, 137, 501/138

(56) References Cited

U.S. PATENT DOCUMENTS 4,987,107 * 1/1991 Narumi et al. ........................ 501/137
5,264,402 * 11/1993 Sano et al. ............................. 501/137

OTHER PUBLICATIONS

CAPLUS 1997:109645, Roberts et al, "Dielectric properties of barium titanate niobate", 1997.*
CAPLUS 1999:693865, Sebastian, "New low loss microwave dielectric ceramics . . . ", 1999.*

* cited by examiner

Primary Examiner—David Brunsman

(57) ABSTRACT

A dielectric ceramic composition comprising $3BaO \cdot 5TiO_2 \cdot 3Nb_2O_5$ ($Ba_3Ti_5Nb_6O_{28}$) as a main component and at least one selected from, as a minor component, (b-1) sintering auxiliary selected from the group consisting of a boron-containing glass compound, CuO, ZnO or mixtures thereof, or (b-2) additives selected from the group consisting of $V_2O_5$, $SnO_2$, MgO, NiO, $Sb_2O_3$, $Bi_2O_3$, LiF, $Ag_2O$ or mixtures thereof, and mixtures of (b-1) and (b-2), and its preparation process are disclosed.

13 Claims, No Drawings

DIELECTRIC CERAMIC COMPOSITIONS AND METHOD OF PREPARATION THEREFOR

BACKGROUND OF THE INVENTION

1. Field of the Invention

The present invention relates to a dielectric ceramic composition having dielectric properties suitable for microwave regions, such as a low dielectric loss, a large dielectric constant and temperature stability, and capable of being sintered at low temperature. More specifically, the present invention pertains to a dielectric ceramic composition suitable for use in electronic parts such as a resonator, a capacitor, a filter and the like, or electronic parts having inner conductors such as embedded substrates, by sintering with metal electrodes such as silver, copper, and silver/palladium, and a method for preparing thereof.

2. Description of the Prior Art

With great advances in electronic and communication technologies, apparatuses and equipments for embodying them have recently been miniaturized. To this miniaturization, stacking and chipping techniques of electronic parts make a great contribution. Recently, according to the development of communication means using microwave bands, such as mobile phones and satellite broadcasting, particular pressure has been placed on electronic parts made of dielectrics to miniaturize.

Representative of the electronic parts to which stacking techniques are applied is a capacitor. Examples of stacked type electronic parts for use in mobile communication terminals include filters, couplers, duplexers, oscillators and multichip modules (MCM). , The stacked type electronic parts, the most portions of which are composed of multilayer dielectrics and inner electrodes, are fabricated by laminating a dielectric into a tape, printing an inner electrode onto the dielectric laminate, stacking a plurality of the laminates and firing the stack.

To be useful for stacked type elements, accordingly, IS dielectrics must be capable of being sintered along with electrodes in addition to having dielectric properties suitable for application. Such dielectric requirements include high dielectric constant ($\in_r$), quality factor (Q×f), and low dependency of resonance frequency modulation on temperature change and the like.

Materials suitable for the inner electrodes are silver, copper, nickel, palladium, platinum, gold and alloys thereof. Selection of the inner electrode materials is made depending on the sintering temperature and properties of the ceramic dielectric used and vice versa.

For example, silver (Ag), showing the lowest specific resistance ($1.62 \times 10^{-4}$ Ωcm) and being inexpensive, cannot be applied to ceramic dielectrics which must be sintered at 950° C. or higher because of its low melting point (961° C.). In spite of their high melting points, gold (Au), platinum and palladium (Pd) are restricted in their use because of their being expensive. As for copper (Cu) or nickel (Ni) electrodes, their very poor oxidation resistance requires sintering at an oxygen partial pressure as low as about $10^{-9}$ atm, causing the problem that, when thermally treated under such a low oxygen partial pressure, most dielectric ceramic compositions show highly increased dielectric loss and thus cannot be used as capacitors.

Ceramic dielectric compositions currently used in stacked type electronic parts are mostly based on $BaTiO_3$, optionally added with oxide sintering aids or glass frits for reduction of sintering temperatures. Typically, these dielectric compositions range, in sintering temperature, from 1,100 to 1,300° C., as well as being resistant to reduction and having dielectric constants of several hundreds or higher. However, their great dielectric loss makes it difficult to apply them where a frequency band of MHz or higher is used. Additionally, the dielectric compositions suffer from the drawback of undergoing a dielectric constant fluctuation of as large as hundreds ppm/° C., which prevents them from being applied to temperature-stable capacitors or electronic parts for mobile communication.

Dielectric compositions known to be usable for stacked type element operable with frequencies of MHz or higher are exemplified by CuO or $V_2O_5$-added $Bi_2O_3$—CaO—$Nb_2O_5$ and glass-added (Mg, Ca)$TiO_3$, (Zr, Sn)$TiO_4$ or (CaO—$ZrO_2$).

CuO or $V_2O_5$-added $Bi_2O_3$—CaO—$Nb_2O_5$ compositions may be sintered at 900° C., and have a dielectric constant of 40 or higher and a quality factor of 1,800 or higher. In addition, chip type stacked capacitors, which use low melting point electrodes such as Ag and Cu, and dielectric resonators using strip lines can be manufactured (Japanese Laid-Open Patent Application No. Hei. 11-34231).

Japanese Laid-Open Patent Application No. Hei. 9-315859 discloses that CaO—$ZrO_2$ is added with alkaline metal compounds including boron, lithium and sodium, and thus can be sintered at 1,000° C. or lower. These compositions, however, have drawbacks of being not effectively sintered at a temperature lower than 1,000° C., being poor in dielectric properties at microwave frequencies, and showing large reactivity with electrode materials.

Another well-known dielectric composition is based on a BaO—$TiO_2$—$Nb_2O_5$ system, whose subtypes comprise $BaTiNb_4O_{13}$, $Ba_3Ti_4Nb_4O_{21}$ and $Ba_3Ti_5Nb_6O_{28}$ which is reported to sinter at 1,350° C. and to have a dielectric constant of 28.1 and a temperature coefficient of the dielectric constant ($\tau_\in$) of −21 (see. "Dielectric properties of barium titanium niobates", G. L. Roberts et al., Journal of Materials Research, Vol. 12 (1997), pp. 526–530). Additionally, it is known that, when a small amount of Ta is substituted for Nb, the dielectric constant is increased and the temperature coefficient may be controlled. Recently, it was reported that, when $Ba_3Ti_5Nb_6O_{28}$ is sintered at 1,300° C. in microwave bands, a sintering density of 4.6, dielectric constant of 41, quality factor (Q×f) of 4500, and temperature coefficient of resonant frequency of 8 ppm/° C. are observed (see. "New low loss microwave dielectric ceramics in the BaO—$TiO_2$—$Nb_2O_5/Ta_2O_5$ system", M. T. Sebastian, Journal of Materials Science; Materials in Electronics, Vol. 10 (1999), pp. 475–478). U.S. Pat. No. 5646080 discloses that a dielectric stable at high temperature comprises a sinterable dielectric ceramic powder composition which can be fabricated into multilayer ceramic capacitors with nickel, nickel alloy, palladium or palladium/silver alloy inner electrodes, the thus formed capacitors having a variation of capacitance with temperature of less than ±20% over the range −55° C. to 140° C. as compared to the value at 25° C.

Accordingly, these compositions still need improvements of low quality factors and, in particular, no low temperature sintering properties, though the temperature stability is excellent and the dielectric constants are high.

SUMMARY OF THE INVENTION

Leading to the present invention, the intensive and thorough research on a ceramic dielectric composition carried out by the present inventors aiming to avoid the problems encountered in the prior arts, resulted in the finding that, when to a dielectric mainly comprising $Ba_3Ti_5Nb_6O_{28}$ is added sintering auxiliaries, the resulting composition having an improved quality factor can be sintered at low temperature and thus baked with low-melting point metal electrodes such as silver (Ag), silver/palladium and copper at the same time, thereby manufacturing stacked or planar elements.

Accordingly, it is an object of the present invention to provide a dielectric ceramic composition to meet high quality factor and low-temperature sintering properties of the dielectric mainly comprising $Ba_3Ti_5Nb_6O_{28}$ having an excellent temperature stability and large dielectric constant.

It is another object of the present invention to provide a method for preparing such dielectric ceramics.

In accordance with an embodiment of the present invention, there is provided a dielectric ceramic composition comprising $3BaO.5TiO_2.3Nb_2O_5$ ($Ba_3Ti_5Nb_6O_{28}$) as a main component and at least one selected from, as a minor component, (b-1) sintering auxiliary selected from the group consisting of a boron-containing glass compound, CuO, ZnO or mixtures thereof in an amount of 0.01–7 parts by weight based on 100 parts by weight of the main component, or (b-2) additives selected from the group consisting of $V_2O_5$, $SnO_2$, MgO, NiO, $Sb_2O_3$, $Bi_2O_3$, LiF, $Ag_2O$ or mixtures thereof in an amount of 0.01–7 parts by weight based on 100 parts by weight of the main component, and mixtures of (b-1) and (b-2).

DETAILED DESCRIPTION OF THE INVENTION

A microwave dielectric ceramic composition of the present invention is prepared by mixing $Ba_3Ti_5Nb_6O_{28}$ as a main component, molar ratio of $BaO:TiO_2:Nb_2O_5$ being 3:5:3, with a sintering auxiliary selected from the group consisting of $B_2O_3$, CuO, ZnO or mixtures thereof.

Without the addition of the sintering auxiliary to $Ba_3Ti_5Nb_6O_{28}$-based composition (sometimes, "the main component"), the composition is sintered at 1,150° C. or higher, and thus cannot be baked with metal electrodes having a low melting point, such as silver (Ag) and silver/palladium alloy.

In contrast, when the main component is added with the sintering auxiliary, the composition is sintered at 850–1,000° C. and thus can be baked with the low-melting point metal electrodes.

The sintering auxiliary of the present invention is preferably added at an amount of 0.01–7 parts by weight, based on the main component. If the addition amount of the sintering auxiliary is present within the above ranges, the composition is readily sintered and its dielectric properties can be improved. On the other hand, if the amount exceeds the ranges of the addition amount, the sintering and dielectric properties cannot be expected to improve.

As necessary, an additive selected from the group consisting of $V_2O_5$, $SnO_2$, MgO, NiO, $Sb_2O_3$, $Bi_2O_3$, LiF, $Ag_2O$ or mixtures thereof may be added to the composition together with the sintering auxiliary. At this point, the additives are preferably added in an amount of 0.01–7 parts by weight, on the basis of 100 parts by weight of the main component. If the amount exists within the above range, the sintering properties of the composition components may be improved.

Meanwhile, $B_2O_3$ of said sintering auxiliaries may be replaced with other compounds providing the same function as $B_2O_3$. In this regard, boron-containing glasses, namely borosilicates or borates, such as $Li_2O—B_2O_3$, $SiO_2—B_2O_3$, $ZnO—B_2O_3$ and so on, may be used. As such, a low-temperature sintering can be conducted at about 900° C.

For improving the dielectric properties of $Ba_3Ti_5Nb_6O_{28}$-based composition itself, a cation substituent selected from the group consisting of SrO, CaO, $ZrO_2$, $SnO_2$, $Ta_2O_5$ or mixtures thereof, may be added. When the cation substituent is added to the $Ba_3Ti_5Nb_6O_{28}$-based composition, the dielectric loss can be reduced, also the dielectric constant and temperature coefficient of resonant frequency can be controlled. Sr in SrO and/or Ca in CaO among such cation substituents are substituted for Ba in the component. In addition, Zr in $ZrO_2$ and/or Sn in $SnO_2$ are substituted for Ti in the component. The addition amount of SrO and CaO or $ZrO_2$ and $SnO_2$ is preferably 0.01–50 mol % of the total amount of the cations (i.e., Sr/Ca+Ba, Zr/Sn+Ti). If the addition amount is outside said ranges, the dielectric loss and the temperature coefficient may be increased. Also, Ta in $Ta_2O_5$ is substituted for Nb in the component. It is preferred that the addition amount of $Ta_2O_5$ is 0.01–50 mol % of the total amount of the cations (i.e., Ta+Nb). If the addition amount exceeds said limits, the sintering properties are worsened.

A method for preparing the dielectric ceramic composition of the present invention is as follows.

The dielectric composition prepared by mixing $Ba_3Ti_5Nb_6O_{28}$ with the cation substituent has an excellent microwave property and thus can be directly applied to high frequency lamination parts. However, this composition has a lowered low-temperature sintering property. Accordingly, for conferring the low-temperature sintering property to the composition, the dielectric composition for low-temperature sintering is prepared through the following processes.

$Ba_3Ti_5Nb_6O_{28}$ and cation-substituted compositions are mixed with oxides selected from the group consisting of $B_2O_3$, CuO, ZnO or mixtures thereof, as the sintering auxiliaries, and calcined after removing moisture contents. Next, the product is ground, added with a binder, molded and sintered to prepare the dielectric composition.

In such preparation processes, any one selected from the group consisting of $V_2O_5$, $SnO_2$, MgO, NiO, $Sb_2O_3$, $Bi_2O_3$, LiF and $Ag_2O$, may be substituted for the sintering auxiliary or may be added as additives, as necessary. (Does it mean these additives can be used instead of sintering auxiliary, in addition to that they can be used additionally?)=> Claims are rewritten.

In order to control the dielectric properties of the prepared dielectric composition, said starting materials may be selectively or all added with SrO, CaO, $ZrO_2$, $SnO_2$ and $Ta_2O_5$, as the cation substituents.

The method for preparing the dielectric ceramic composition of the present invention can be employed in manufacturing practical lamination parts such as dielectric filters for PCS. In particular, $Ba_3Ti_5Nb_6O_{28}$-based compositions are added with the cation substituent and then may be selectively added with the sintering auxiliaries or the additives to manufacture the practical lamination parts, such as dielectric filters for PCS.

In this regard, the starting materials are weighed and then added with polyvinyl butiral and a plasticizer. The mixture is introduced into an organic solvent, and then mixed for 24 hours to prepare a slurry for a tape casting.

The slurry is deaerated and then introduced into a tape caster to manufacture a thin dielectric tape having 10–100 μm thickness. Thereafter, inner electrodes are printed on the tape using a silver paste. The printed tapes are headed up one by one and heated to 40–70° C. while conducting a lamination process under pressure. Then, the laminate is cut to predetermined sizes, passed through a binder burn-out process and then sintered at 900° C. for 2 hours.

Thusly manufactured lamination parts are measured for frequency properties. As a result, an insertion loss of the parts is 1 dB or less so that the parts are superior to conventional products.

Meanwhile, instead of using such dielectric tapes, the dielectric powder is used to prepare a paste, whereby the paste may be repeatedly printed to manufacture the lamination parts.

The dielectric composition of the present invention can be sintered at about 900° C. Accordingly, the composition can be simultaneously sintered, together with low-melting point electrodes, such as a pure silver (Ag) electrode. In addition, the dielectric composition can be used in preparation of temperature stable parts, such as temperature stabilized lamination capacitors (NPO MLCC) because of having a large dielectric constant and a temperature coefficient of resonant frequency of ±10 ppm/° C. or lower. As well, the dielectric composition can be employed in communication parts, including a filter for microwave, an oscillator, a planar antenna, a MCM and the like, owing to having an excellent quality factor (Qxf) of 5,000 or higher at frequencies of 7–9 GHz. The dielectric composition of the present invention has unchanged dielectric properties at a sintering temperature range of 900–950° C. and the temperature coefficient of resonant frequency ($\tau_f$) of ±10 ppm/° C. or lower, thereby allowing efficient manufacture of application products.

A better understanding of the present invention may be obtained in light of the following examples which are set forth to illustrate, but are not to be construed to limit the present invention.

EXAMPLES 1–20 and COMPARATIVE EXAMPLE 1

These examples and comparative example show changes of dielectric properties and sintering properties when $Ba_3Ti_5Nb_6O_{28}$-based composition is added with oxides-sintered auxiliaries.

To test the effect of addition of oxides-sintered auxiliaries on the properties of the $Ba_3Ti_5Nb_6O_{28}$-based composition, dielectric compositions for radio frequency bands are prepared.

A preparation process therefor and an analysis result of dielectric properties and sintering properties of the prepared dielectric composition for radio frequency bands are as follows.

As starting materials, 99.9% pure $BaCO_3$, $TiO_2$ and $Nb_2O_5$ were weighed such that their molar ratios were 3:5:3. Then, the weighed materials and distilled water were introduced into a polyethylene bottle, at a weight ratio of 1:1. For smooth mixing, a dispersant was added in an amount of 1 part by weight. Thusly prepared samples were introduced into a ball mill to mix for 24 hours using an Yttria stabilized Zirconia.

The mixed slurry was heated in an oven at 100° C. to remove moisture, and then put into an alumina crucible to calcine at 1100° C. for 2 hours. The calcined powder was mixed with the sintering auxiliaries and additives at desired weight ratios to conduct a milling process for 24 hours as the same mixing process as described above. $B_2O_3$, CuO, ZnO or mixtures thereof useful as the sintering auxiliaries were added in an amount of 1–7 parts by weight, or the additives such as $V_2O_5$, $SnO_2$, MgO, NiO, $Sb_2O_3$, $Bi_2O_3$, LiF and $Ag_2O$, were simultaneously added, along with the sintering auxiliaries.

The milled slurry was added with 1 part by weight of polyvinyl alcohol (PVA) as a binder to grain. The grained powders were molded in a cylindrical form having 10 mm diameter and 4–5 mm height under 1000 kg/cm² pressure and then subjected to sintering under air atmosphere at a temperature range of 1200 to 1300 0C. The rate for increasing the temperature was 5° C./min and cooling was conducted in the furnace. The bulk density of sintered samples was determined by the Archimedes' method. (see. J. S. Reed, in *Introduction to the Principles of Ceramic Processing*, Wiley, Singapore (1989), pp. 108–110)

Thusly sintered pieces were examined for their dielectric properties. For dielectric characteristics in GHz frequency bands, each sinter sample was measured using a Hewlett Packard HP8720C network analyzer in the frequency range of 6–9 GHz. The quality factor (Qxf) was measured by the transmission cavity method using a Cu cavity and a Teflon supporter. (see. D. Kaifez and P. Guillion, *Dielectric resonators*, Artech House, Norwood, Mass., 1986, pp. 327–376) The relative dielectric constant ($\in_r$) was measured using the post resonator method and the temperature coefficient of the resonant frequency ($\tau_f$) was measured using an Invar cavity in the temperature range of 20 to 80° C. (see. "A dielectric resonator method of measuring inductive capacities in the millimeter range", B. W. Hakki and P. D. Coleman, *IRE Trnas. Microwave Theory & Technol.*, Vol. 8 (1960), pp. 402–410, and "Precise measurement method for temperature coefficient of microwave dielectric resonator material", T. Nishikawa, K. Wamino, H. Tamura, H. Tanaka, and Y. Ishikawa, *IEEE MTT-S Digest*, Vol. 3 (1987), pp. 277–280)

The following table 1 shows the sintering properties and the dielectric properties when the dielectric composition $Ba_3Ti_5Nb_6O_{28}$ mixed with the sintering auxiliaries and additives was sintered at 850–1000° C. in the air.

TABLE 1

Sintering and Dielectric Properties of $Ba_3Ti_5Nb_6O_{28}$ composition at Low Temperature

| Examp. No. | Additives (wt %) | | | | | | | | | | | Sintering Temp. (° C.) | Sintering Density (g/cm³) | Qual. fac. (Qxf) | Dielec. Const. ($\epsilon_r$) | Temp. Coeffi- of Resonant Freq. ($\tau_f$, × $10^{-6}$/° C.) |
|---|---|---|---|---|---|---|---|---|---|---|---|---|---|---|---|---|
| | $B_2O_3$ | ZnO | CuO | $V_2O_5$ | $Sb_2O_3$ | LiF | $SnO_2$ | MgO | NiO | $Bi_2O_3$ | $Ag_2O_3$ | | | | | |
| C.1 | — | — | — | — | — | — | — | — | — | — | — | 1150 | 5.05 | 9000 | 38 | 0 |
| 1 | 3 | — | — | — | — | — | — | — | — | — | — | 1000 | 4.71 | 26700 | 33 | −7 |
| 2 | 5 | — | — | — | — | — | — | — | — | — | — | 1000 | 4.76 | 26000 | 34 | −12 |
| 3 | 2 | 2 | — | — | — | — | — | — | — | — | — | 925 | 4.94 | 24900 | 38 | 1 |
| 4 | 2 | 3 | — | — | — | — | — | — | — | — | — | 925 | 5.07 | 18000 | 39 | 3 |
| 5 | 2 | 5 | — | — | — | — | — | — | — | — | — | 950 | 5.04 | 21000 | 36 | 4 |
| 6 | 3 | 3 | — | — | — | — | — | — | — | — | — | 925 | 5.05 | 16000 | 38 | 2 |

TABLE 1-continued

Sintering and Dielectric Properties of $Ba_3Ti_5Nb_6O_{28}$ composition at Low Temperature

| Exmp. No. | Additives (wt %) | | | | | | | | | | | Sintering Temp. (° C.) | Sintering Density (g/cm$^3$) | Qual. fac. (Qxf) | Dielec. Const. ($\epsilon_r$) | Temp. Coeffi. of Resonant Freq. ($\tau_f$, × $10^{-6}/°$ C.) |
|---|---|---|---|---|---|---|---|---|---|---|---|---|---|---|---|---|
| | $B_2O_3$ | ZnO | CuO | $V_2O_5$ | $Sb_2O_3$ | LiF | $SnO_2$ | MgO | NiO | $Bi_2O_3$ | $Ag_2O_3$ | | | | | |
| 7 | 3 | 4.5 | — | — | — | — | — | — | — | — | — | 875 | 5.06 | 16000 | 35 | −3 |
| 8 | 3 | 5 | — | — | — | — | — | — | — | — | — | 900 | 5.02 | 14000 | 35 | −10 |
| 9 | 4 | 5 | — | — | — | — | — | — | — | — | — | 925 | 4.99 | 12000 | 35 | −8 |
| 10 | 5 | 5 | — | — | — | — | — | — | — | — | — | 925 | 5.05 | 14000 | 35 | −9 |
| 11 | 1 | — | 5 | — | — | — | — | — | — | — | — | 875 | 4.79 | 25300 | 38 | 9 |
| 12 | 3 | — | 3 | — | — | — | — | — | — | — | — | 900 | 5.02 | 23300 | 36 | −1 |
| 13 | 3 | — | — | 3 | — | — | — | — | — | — | — | 900 | 4.84 | 2000 | 36 | −9 |
| 14 | 3 | — | — | — | 3 | — | — | — | — | — | — | 1000 | 4.31 | — | — | — |
| 15 | 3 | — | — | — | — | 5 | — | — | — | — | — | 900 | 4.48 | 4000 | 36 | −3 |
| 16 | 3 | — | — | — | — | — | 3 | — | — | — | — | 1000 | 4.25 | — | — | — |
| 17 | 3 | — | — | — | — | — | — | 3 | — | — | — | 1000 | 4.84 | 12000 | 58 | 11 |
| 18 | 3 | — | — | — | — | — | — | — | 3 | — | — | 1000 | 4.68 | — | — | — |
| 19 | 3 | — | — | — | — | — | — | — | — | 5 | — | 925 | 4.79 | 3200 | 35 | −3 |
| 20 | 3 | — | — | — | — | — | — | — | — | — | 1 | 1000 | 4.86 | 23200 | 36 | 5 |

From the result of the above table 1, it can be seen that the sintering temperature is drastically decreased when $Ba_3Ti_5Nb_6O_{28}$-based dielectric compositions are added with the sintering auxiliaries or additives, being oxides. In the comparative example 1, sintering auxiliaries not added $Ba_3Ti_5Nb_6O_{28}$ composition was sintered at 1,150° C., thereby having a quality factor of 9,000 and a dielectric constant of 38. In particular, this composition has the advantage that a temperature coefficient of resonant frequency is 0.

Meanwhile, it can be seen that the oxides affecting the sintering temperature are the sintering auxiliaries, such as $B_2O_3$, ZnO, CuO and the like. These auxiliaries act to improve the quality factor and to decrease the values of the temperature coefficient of resonant frequency, in addition to improving the sintering properties. However, if the auxiliaries are excessively added in an amount of 5 part by weight or higher, the dielectric constant is slightly reduced. Accordingly, it is preferred that the maximum amount to be added is 7 part by weight. Further, the oxides such as $V_2O_5$, $SnO_2$, MgO, NiO, $Sb_2O_3$, $Bi_2O_3$, LiF or $Ag_2O$ useful as the additives are responsible for decreasing the sintering temperature.

As shown in the examples of table 1, when $Ba_3Ti_5Nb_6O_{28}$-based compositions are added with the sintering auxiliaries and the additives, sintering is conducted at 1000° C. or lower and the quality factor can be improved.

Accordingly, the composition may be baked with low melting point electrodes, including silver, copper or silver/palladium, to manufacture laminated elements.

EXAMPLES 21–29

These examples show the changes of the dielectric properties and the sintering properties when $Ba_3Ti_5Nb_6O_{28}$-based composition is added with boron-based glass.

$B_2O_3$, ZnO, $Li_2CO_3$, $SiO_2$, and $Al_2O_3$ were mixed to dryness at appropriate weight ratios, and then introduced into a platinum furnace under air atmosphere, followed by melting the mixture at 900–1400° C. The melt was stood at the same temperature for 1 hour to have a homogeneous composition, followed by quenching to prepare 10 g of glass. The formed glass was introduced into a ball mill and then subjected to wet milling using an Yttria stabilized Zirconia for 48 hours. The milled glass was dried and sieved to obtain a homogeneous sample having a particle size of 20 μm or lower, after which 3 part by weight of the sample was added to the main component, $Ba_3Ti_5Nb_6O_{28}$. The additives as described above were added to prepare a dielectric composition using the same procedure as in a process for manufacturing a dielectric.

The sintering properties and the microwave dielectric properties of thusly manufactured dielectric composition are shown in the table 2, below.

TABLE 2

Sintering and Dielectric Properties of 3 wt % of Glass added $Ba_3Ti_5Nb_6O_{28}$ Composition

| Exmp. No. | Glass Composition (wt %) | | | | | Sintering Temp. (° C.) | Sintering Density (g/cm$^3$) | Qual. fac. (Qxf) | Dielec. Const. ($\epsilon_r$) | Temp. Coeffi. of Resonant Freq. ($\tau_f$, × $10^{-6}/°$ C.) |
|---|---|---|---|---|---|---|---|---|---|---|
| | $B_2O_3$ | ZnO | $Li_2O$ | $SiO_2$ | $Al_2O_3$ | | | | | |
| 21 | 60 | — | 30 | — | 10 | 1000 | 4.62 | 22000 | 32 | −4 |
| 22 | 60 | — | 40 | — | — | 925 | 5.31 | 15000 | 35 | −5 |
| 23 | 40 | — | — | 60 | — | 1000 | 4.90 | 18400 | 34 | 2 |

TABLE 2-continued

Sintering and Dielectric Properties of 3 wt % of Glass added $Ba_3Ti_5Nb_6O_{28}$ Composition

| Exmp. No. | Glass Composition (wt %) | | | | | Sintering Temp. (° C.) | Sintering Density (g/cm³) | Qual. fac. (Qxf) | Dielec. Const. ($\epsilon_r$) | Temp. Coeffi. of Resonant Freq. ($\tau_f$, × $10^{-6}$/° C.) |
|---|---|---|---|---|---|---|---|---|---|---|
| | $B_2O_3$ | ZnO | $Li_2O$ | $SiO_2$ | $Al_2O_3$ | | | | | |
| 24 | 80 | — | 20 | — | — | 925 | 4.79 | 22000 | 33 | −4 |
| 25 | 60 | — | 30 | 10 | — | 925 | 4.72 | 17300 | 33 | −8 |
| 26 | 50 | 50 | — | — | — | 925 | 5.02 | 19000 | 37 | −2 |
| 27 | 35 | 65 | — | — | — | 925 | 5.06 | 20700 | 38 | 7 |
| 28 | 30 | 70 | — | — | — | 925 | 5.03 | 18300 | 38 | 6 |
| 29 | 30 | 60 | — | — | 10 | 925 | 4.98 | 17000 | 38 | 8 |

From the result of the above table 2, it can be seen that, when $Ba_3Ti_5Nb_6O_{28}$-based composition are added with $B_2O_3$—$Li_2O$ type and $B_2O_3$—ZnO type borate glass and $B_2O_3$—$SiO_2$ type borosilicate glass, the sintering temperature can be greatly decreased. In addition, when small amount of $Al_2O_3$ and $SiO_2$ are added to these glasses, the quality factor can be improved.

As seen in the above tables 1 and 2, addition of oxide addtives and glass lowers the sintering temperature $Ba_3Ti_5Nb_6O_{28}$-based to about 900° C. Also, the composition has a dielectric constant of 33–39 and an excellent quality factor of 10,000 or higher so as to be useful as microwave elements having a GHz band. In this regard, when manufacturing chip-type parts such as a chip LC filter, a chip duplexer, a planar antenna, a planar filter, a MCM and a circuit substrate, miniaturization and low dielectric loss of parts can be realized because the composition of the present invention has a high dielectric constant and a small dielectric loss. Additionally, the dielectric composition with a low temperature coefficient of resonant frequency can be used as temperature-stabilized capacitors (NPO MLCC).

The dielectric composition prepared by adding $Ba_3Ti_5Nb_6O_{28}$-based composition with only sintering auxiliaries and additives can not only apply to microwave lamination parts for high frequency, but also be baked with low-melting point electrodes at the same time.

EXAMPLES 30–44

These examples show the changes of the dielectric properties and the sintering properties when some cations of $Ba_3Ti_5Nb_6O_{28}$-based compositions are replaced with other cations.

The dielectric composition for high frequency was prepared to confirm the changes of the above properties. The preparation process and the analysis results of the dielectric properties and the sintering properties of the prepared composition are as follows.

As starting materials, 99.9% pure $BaCO_3$, $SrCO_3$, $CaCO_3$, $TiO_2$, $ZrO_2$, $SnO_2$, $Nb_2O_5$ and $Ta_2O_5$ were weighed so that the molar ratio of ($BaCO_3$, $SrCO_3$, $CaCO_3$):($TiO_2$, $ZrO_2$, $SnO_2$):($Nb_2O_5$, $Ta_2O_5$) was 3:5:3. The same dielectric composition preparation procedure as in above examples was repeated except that the staring materials were different.

The following table 3 shows the sintering properties and the dielectric properties when Sr, Ca, Sn, Zr, and Ta substituted for cations of $Ba_3Ti_5Nb_6O_{28}$, compositions are sintered at 1,150–1,550° C. in the air.

TABLE 3

Sintering and Dielectric Properties of $(Ba_{3-x}A_x)(Ti_{5-y}B_y)(Nb_{6-z}C_z)O_{28}$ Compositions

| Exmp. No. | A(x) | | B(y) | | C(z) | Sintering Temp. (° C.) | Sintering Density (g/cm³) | Qual. fac. (Qxf) | Dielec. Const. ($\epsilon_r$) | Temp. Coeffi. of Resonant Freq. ($\tau_f$, × $10^{-6}$/° C.) |
|---|---|---|---|---|---|---|---|---|---|---|
| | SrO | CaO | $ZrO_2$ | $SnO_2$ | $Ta_2O_3$ | | | | | |
| 30 | 1 | — | — | — | — | 1200 | 5.00 | — | — | — |
| 31 | 3 | — | — | — | — | 1200 | 4.78 | — | — | — |
| 32 | — | 1 | — | — | — | 1200 | 4.93 | 1000 | — | — |
| 33 | — | 3 | — | — | — | 1250 | 4.71 | — | — | — |
| 34 | — | — | 1 | — | — | 1200 | 5.08 | 28100 | 37 | −10 |
| 35 | — | — | 2 | — | — | 1200 | 4.96 | 6400 | 36 | −27 |
| 36 | — | — | 5 | — | — | 1300 | 5.37 | 8400 | 28 | −64 |
| 37 | — | — | — | 1 | — | 1300 | 5.31 | 10000 | 38 | −1 |
| 38 | — | — | — | 2 | — | 1300 | 5.47 | 7000 | 37 | −6 |
| 39 | — | — | — | 5 | — | 1300 | 5.36 | 2500 | 35 | −14 |
| 40 | — | — | — | — | 1 | 1250 | 5.35 | 25000 | 39 | −2 |
| 41 | — | — | — | — | 3 | 1300 | 5.70 | 29000 | 40 | −4 |
| 42 | — | — | — | — | 6 | 1350 | 6.63 | 2400 | — | −7 |

TABLE 3-continued

Sintering and Dielectric Properties of $(Ba_{3-x}A_x)(Ti_{5-y}B_y)(Nb_{6-z}C_z)O_{28}$ Compositions

| Exmp. No. | A(x) SrO | A(x) CaO | B(y) ZrO$_2$ | B(y) SnO$_2$ | C(z) Ta$_2$O$_3$ | Sintering Temp. (° C.) | Sintering Density (g/cm$^3$) | Qual. fac. (Qxf) | Dielec. Const. ($\epsilon_r$) | Temp. Coeffi. of Resonant Freq. ($\tau_f$, × 10$^{-6}$/° C.) |
|---|---|---|---|---|---|---|---|---|---|---|
| 43 | — | — | — | 5 | 6 | 1550 | 4.23 | — | — | — |
| 44 | — | — | 1 | 1 | — | 1300 | 4.95 | 2600 | — | — |

As best seen in the above table 3, when the cations of $Ba_3Ti_5Nb_6O_{28}$-based compositions are replace with a small amount of other cations, the formed dielectric composition shows changes of the dielectric properties as follows.

In the examples 30–33, when Sr and Ca are substituted for Ba in the composition, the dielectric loss is drastically increased. In the examples 34–39, when Zr and Sn are substituted for Ti in the composition, the quality factor is greatly increased. In the examples 40–42, when Nb is replaced with Ta, the quality factor is improved but the sintering properties are slightly decreased.

Accordingly, it can be seen that the dielectric properties required to manufacture particular electronic parts can be controlled by selecting the elements to be substituted and their amounts.

EXAMPLES 45–56

These examples show the changes of the dielectric properties and the sintering properties when the substituted $Ba_3Ti_5Nb_6O_{28}$-based composition is added with the sintering auxiliaries and additives. The result is given in the table 4, below.

Sr and Ca and $B_2O_3$, ZnO and CuO are added, has increased dielectric constants and temperature coefficients. In the case of Sr-substituted composition having increased temperature coefficients, when $B_2O_3$ and ZnO are added, the temperature coefficient can be again decreased and thus controlled at about 0.

In addition, though the composition replaced with Zr, Sn or Ta has greatly increased quality factors, excess addition can make the sintering properties worse.

When $Ba_3Ti5Nb_6O_{28}$-based ceramic dielectric compositions of the present invention are added with the sintering auxiliaries and the additives, the composition can be sintered at 1,000° C. or lower and thus simultaneously baked with low-melting point electrodes. Thusly prepared ceramic dielectric compositions can be used as a dielectric of the lamination capacitors (MLCC). In particular, the composition is suitable for use in manufacturing mobile communication parts, such as PCS, because of having a low dielectric loss and a low dielectric constant temperature coefficient. Further, when cations of $Ba_3Ti_5Nb_6O_{28}$-based composition are substituted, the low temperature sintered composition with a low dielectric constant and a low resonance frequency can be selectively prepared. Furthermore, the temperature

TABLE 4

Sintering and Dielectric Properties of $(Ba_{3-x}A_x)(Ti_{5-y}B_y)(Nb_{6-z}C_z)O_{28}$ Compositions

| Exmp. No. | A(x) SrO | A(x) CaO | B(y) ZrO$_2$ | B(y) SrO | C(z) CaO | Additives (wt %) B$_2$O$_3$ | Additives (wt %) ZnO | Additives (wt %) CuO | Sintering Temp. (° C.) | Sintering Density (g/cm$^3$) | Qual. fac. (Qxf) | Dielec. Const. ($\epsilon_r$) | Temp. Coeffi. of Resonant Freq. ($\tau_f$, × 10$^{-6}$/° C.) |
|---|---|---|---|---|---|---|---|---|---|---|---|---|---|
| 45 | 1 | — | — | — | — | 3 | 5 | — | 1000 | 4.77 | 5800 | 54 | 77 |
| 46 | 1 | — | — | — | — | 1 | — | 5 | 900 | 4.97 | 4000 | 46 | 21 |
| 47 | — | 1 | — | — | — | 3 | 5 | — | 900 | 5.10 | — | — | — |
| 48 | — | 1 | — | — | — | 1 | — | 5 | 900 | 4.90 | 5600 | 39 | 39 |
| 49 | — | — | 1 | — | — | 3 | 5 | — | 1000 | 5.04 | 125000 | 48 | 42 |
| 50 | — | — | 2 | — | — | 3 | 5 | — | 1000 | 4.79 | 17600 | 41 | 23 |
| 51 | — | — | — | 1 | — | 3 | 5 | — | 900 | 5.27 | 10000 | 39 | 12 |
| 52 | — | — | — | 1 | — | 1 | — | 5 | 925 | 5.35 | 25900 | 35 | −12 |
| 53 | — | — | — | 2 | — | 3 | 5 | — | 900 | 5.32 | 2000 | — | — |
| 54 | — | — | — | — | 1 | 3 | 5 | — | 925 | 5.27 | 25000 | 38 | 3 |
| 55 | — | — | — | — | 3 | 3 | 5 | — | 1000 | 5.71 | 31000 | 39 | 23 |
| 56 | — | — | — | — | 6 | 3 | 5 | — | 1000 | 6.26 | 22000 | 41 | 44 |

From the results of the above table 4, it can be seen that the oxides can greatly affect the sintering properties and the dielectric properties of the compositions in which cations of $Ba_3Ti_5Nb_6O_{28}$ are replaced with other cations. The low-temperature sintered composition, where Ba is replaced with coefficient of resonant frequency changes are very small so that the composition can be applied to temperature stabilized parts, for example, temperature stabilized capacitors (NPO MLCC), microwave oscillators, substrates, filters, planar antennas and the like. The dielectric composition of the present invention has the advantage that the components having excellent dielectric properties are variously used, and the dielectric properties according to the sintering temperatures are little changed so as to stably manufacture the products.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A dielectric ceramic composition comprising $3BaO \cdot 5TiO_2 \cdot 3Nb_2O_5$ ($Ba_3Ti_5Nb_6O_{28}$) as a main component and at least one selected from, as a minor component, (b-1) sintering auxiliary selected from the group consisting of a boron-containing glass compound, CuO, ZnO or mixtures thereof in an amount of 0.01–7 parts by weight based on 100 parts by weight of the main component, or (b-2) additives selected from the group consisting of $V_2O_5$, $SnO_2$, MgO, NiO, $Sb_2O_3$, $Bi_2O_3$, LiF, $Ag_2O$ or mixtures thereof in an amount of 0.01–7 parts by weight based on 100 parts by weight of the main component, or mixtures of (b-1) and (b-2).

2. The dielectric ceramic composition as defined in claim 1, comprising as the minor component at least one selected from (b-1), and at least one selected from (b-2).

3. The dielectric ceramic composition as defined in claim 1, wherein the boron-containing glass compound is $B_2O_3$, $B_2O_3$—$Li_2O$, $B_2O_3$—ZnO, or $B_2O_3$—$SiO_2$.

4. The dielectric ceramic composition as defined in claim 1, comprising two or more boron-containing glass compounds.

5. The dielectric ceramic composition as defined in claim 1, wherein part of Ba in the main component is replaced with any one or both of Sr and Ca.

6. The dielectric ceramic composition as defined in claim 5, wherein Sr and Ca, in sigle or as mixtures are used in an amount of 0.1–50 mol % based on the total amount of Ba+Sr/Ca.

7. The dielectric ceramic composition as defined in claim 1, wherein part of Ti in the main component is replaced with any one or both of Sn and Zr.

8. The dielectric ceramic composition as defined in claim 7, wherein Sn and Zr, in sigle or as mixtures are used in an amount of 0.1–50 mol % based on the total amount of Ti+Sn/Zr.

9. The dielectric ceramic composition as defined in claim 1, wherein part of Nb in the main component is replaced with Ta.

10. The dielectric ceramic composition ad defined in claim 9, wherein Ta is used in an amount of 0.1–50 mol % based on the total amount of Nb+Ta.

11. The dielectric ceramic composition as defined in claim 1, wherein part of Ba in the main component is replaced with any one or both of Sr and Ca; part of Ti is replaced with any one or both of Sn and Zr; and part of Nb in the main component is replaced with Ta.

12. The dielectric ceramic composition as defined in claim 11, wherein the Sr or Ca, Sn or Zr, and Ta are replaced in an amount of 0.1–50 mol % based on the total amounts of Ba+Sr/Ca, Ti+Sn/Zr, and Nb+Ta, respectively.

13. A method for preparing a dielectric ceramic composition, comprising the following steps of:

mixing $Ba_3Ti_5Nb_6O_{28}$ as a main component with at least one sintering auxiliaries selected from the group consisting of $B_2O_3$, CuO, and ZnO to give a mixture;

calcining the mixture;

grinding the calcined mixture to give a mold; and sintering the mold at 1,000° or lower.

* * * * *